No. 892,478. PATENTED JULY 7, 1908.
J. H. WESSON.
LOCK NUT DEVICE.
APPLICATION FILED OCT. 18, 1907.
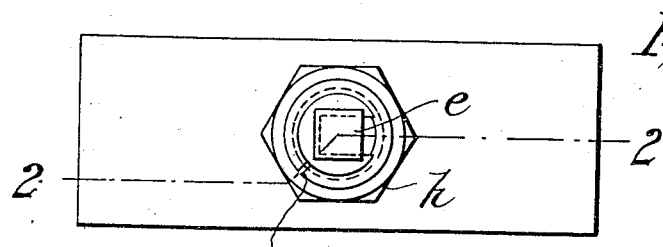
Fig. 1.
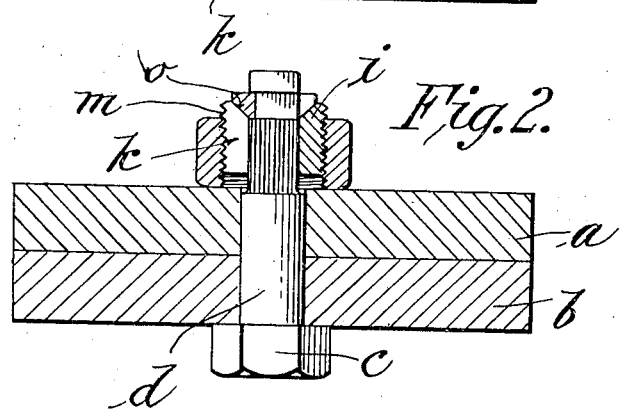
Fig. 2.
Fig. 3.
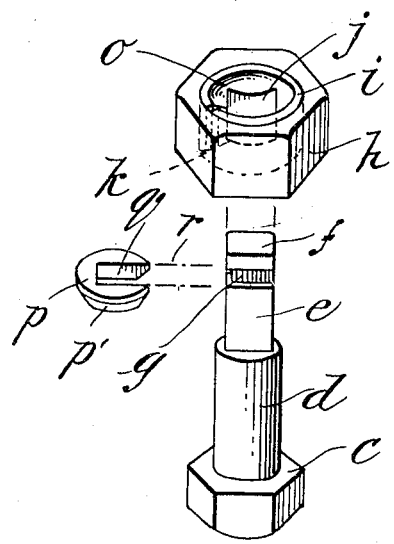
Witnesses:
H. L. Sprague
H. W. Bowen.
Inventor,
Joseph H. Wesson.
by Chapin &co
Attorneys.

UNITED STATES PATENT OFFICE.

JOSEPH H. WESSON, OF SPRINGFIELD, MASSACHUSETTS.

LOCK-NUT DEVICE.

No. 892,478.    Specification of Letters Patent.    Patented July 7, 1908.

Application filed October 18, 1907. Serial No. 398,071.

*To all whom it may concern:*

Be it known that I, JOSEPH H. WESSON, a citizen of the United States of America, residing at Springfield, in the county of Hampden and State of Massachusetts, have invented new and useful Improvements in Lock-Nut Devices, of which the following is a specification.

My invention relates to improvements in lock-nut devices, and it has for its object to provide a structure that is simple in construction, reliable in its operation, and one that can be quickly applied.

A further and an important object of the invention is to provide a device that can be used in places where the space will not permit the employment of an ordinary wrench so as to tighten or loosen nuts, the device being so constructed that the nut can be turned or rotated into its tightening position with the fingers and then, by a slight movement of the wrench, can be firmly set. A reverse operation for loosening the nut would be by slightly turning the nut backwards and the remainder of the operation being performed by hand so that the bolt may be removed.

Broadly, the invention consists in providing the shank portion of the bolt with flat surfaces and with means for retaining a sleeve thereon for engaging the flat surface of the bolt, the sleeve being threaded on its exterior surface and slitted. An ordinary nut is then applied to the threaded portion of the sleeve whereby when the nut is threaded downward the sleeve will be advanced outwardly toward the end of the bolt, the outer end of the sleeve being further provided with a conical surface for receiving the means that is suitably retained on the end of the bolt so that as the nut is threaded inward the split sleeve will be advanced outwardly against said means, whereby the sleeve is expanded and the nut firmly locked to the bolt.

In the drawings forming part of this application,—Figure 1 is a plan view of my improvement. Fig. 2 is a longitudinal sectional view on line 2—2, Fig. 1. Fig. 3 is a detail perspective view of the parts of the device before assembling.

Referring to the drawings in detail,—$a$ and $b$ designate for the sake of clearness in describing the operation of my invention,) two pieces, either metal or wood, that are to be clamped together.

$c$ designates the bolt as a whole having the usual round or shank portion $d$. The outer end $e$ of the bolt is preferably made rectangular in form, as shown in the plan view Fig. 1, or in the perspective view in Fig. 3 at $f$. Cut in the rectangular portion $f$, and near the outer end thereof, and on three sides, is the channel or grooved portion $g$ which is shown clearly in Figs. 1 and 3. The nut $h$ which is to be firmly locked in the bolt $c$, is of the ordinary construction.

$i$ designates a sleeve which is provided with an opening $j$ therethrough corresponding in shape, and slightly larger in size than the rectangular portion $f$ of the bolt $c$. This sleeve is also provided with a longitudinal slit $k$ parallel with the axis of the bolt that is clearly shown in the sectional view Fig. 2, and in the perspective view Fig. 3. The sleeve $i$ is further provided on its external surface with threads $m$, as shown in Fig. 2. The outer end of this sleeve is beveled or made conical and slopes towards the center or axis of the sleeve, as shown at $o$.

A split washer or expanding element $p$ is provided with a rectangular opening $q$, the internal dimensions of which are slightly larger than the external dimensions of the grooved portion $g$ of the bolt, as shown clearly by the dotted lines $r$ in Fig. 3. The element $p$ is provided with a conical or wedge-shaped surface $p^1$.

The assembling of the parts of the lock-nut is as follows:—The bolt $c$ having been passed through the registering openings of the pieces $a$ and $b$, the sleeve $i$ is first threaded into the nut $h$ so that the outer ends of the nut and sleeve are practically flush with each other. The sleeve and nut are then slipped onto the rectangular portions $e$ of the bolt and into engagement with the piece $a$; the split washer or expanding element $p$ is then slipped into the grooved portion $g$ of the bolt; the operator then rotates the nut $h$, which operation causes the sleeve $i$ to be advanced outwardly and the conical portion thereof brought into engagement with the split washer or expanding element $p$, this operation being performed by hand.

The washer or expanding element $p$, by reason of the conical surface $p^1$ and the slit $k$ in the sleeve $i$ causes the sleeve to expand, and the external and internal threads of the sleeve and nut respectively to be firmly locked together. In order that the nut $h$ may now be set with greater firmness against the piece *a* only a very slight rotary movement is required to effect this result, to turn the nut *h*, it being possible to use an ordinary wrench even in a confined or close space.

When it is desired to loosen the nut, a slight movement with a wrench in the reverse direction will loosen the nut *h* so that the same may be rotated in a reverse direction by the hand, thus sliding the threaded sleeve *i* inward on the shank portion *e* of the bolt to the position shown in Fig. 3; then by removing the sleeve-expanding element *p* from the grooved portion *q* the nut and sleeve may be slipped together off of the bolt.

What I claim, is:—

1. A locking device for nuts having in combination with the shank portion of a bolt an externally threaded sleeve for receiving the nut and having a slit therein to permit its expansion, expanding means mounted on the bolt for engaging said sleeve, whereby when the nut is rotated in contact with an abutment the sleeve will be expanded and the nut locked thereto.

2. In a device of the class described having in combination with the shank portion of the bolt, a slitted sleeve for engaging the shank portion thereof and threaded on its exterior surface, a nut engaging the sleeve, an expanding element mounted on the outer end of the bolt and engaging the sleeve, whereby when the nut is rotated in one direction the sleeve will be expanded and the nut locked, and when the same is rotated in an opposite direction the sleeve will be permitted to contract and loosen the nut, as described.

3. In a nut locking device comprising an expansible element movably mounted on the shank portion of the bolt, an expanding element carried by said shank, said expanding element having an opening for permitting the lateral removal from the bolt, and a conical surface for engaging the expansive element, whereby when the expansive element is moved toward the expanding element, as described, the nut will be locked.

4. In a device for locking a nut to its bolt having in combination with a flat surface of the bolt a slitted sleeve, the outer end of said sleeve being provided with a conical surface, an expanding element removably secured to the shank portion of the bolt and provided with a correspondingly shaped conical or wedge-shaped surface, the exterior surface of the sleeve being threaded to receive the nut, whereby when the nut is brought into engagement with a suitable abutment and the nut rotated in one direction, the sleeve and nut will be locked to each other and to the bolt, and when rotated in the opposite direction the sleeve and nut will be unlocked, as described.

JOSEPH H. WESSON.

Witnesses:
K. I. CLEMONS,
WM. H. CHAPIN.